Figure 1:
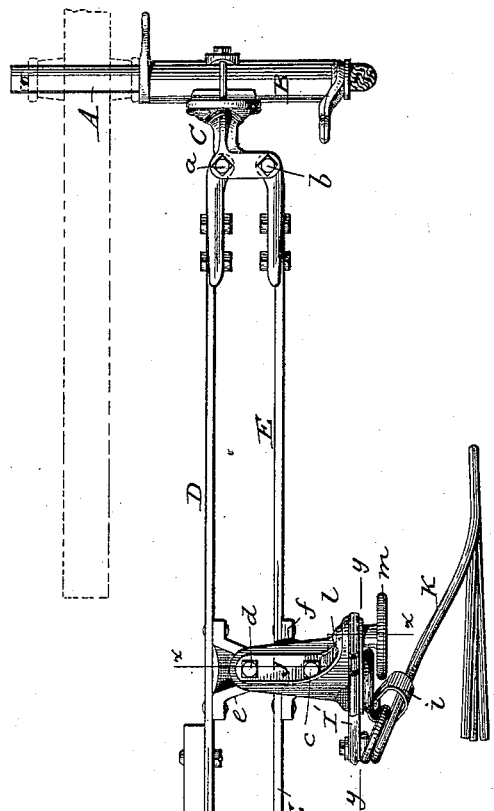

(No Model.)  3 Sheets—Sheet 1.

W. P. BROWN.
WHEEL CULTIVATOR.

No. 345,111.  Patented July 6, 1886.

Attest.
Sidney P. Hollingsworth
Wm. P. Kennedy

Inventor.
W. P. Brown.
By his Atty.
Phil T. Dodge

N. PETERS, Photo-Lithographer, Washington, D. C.

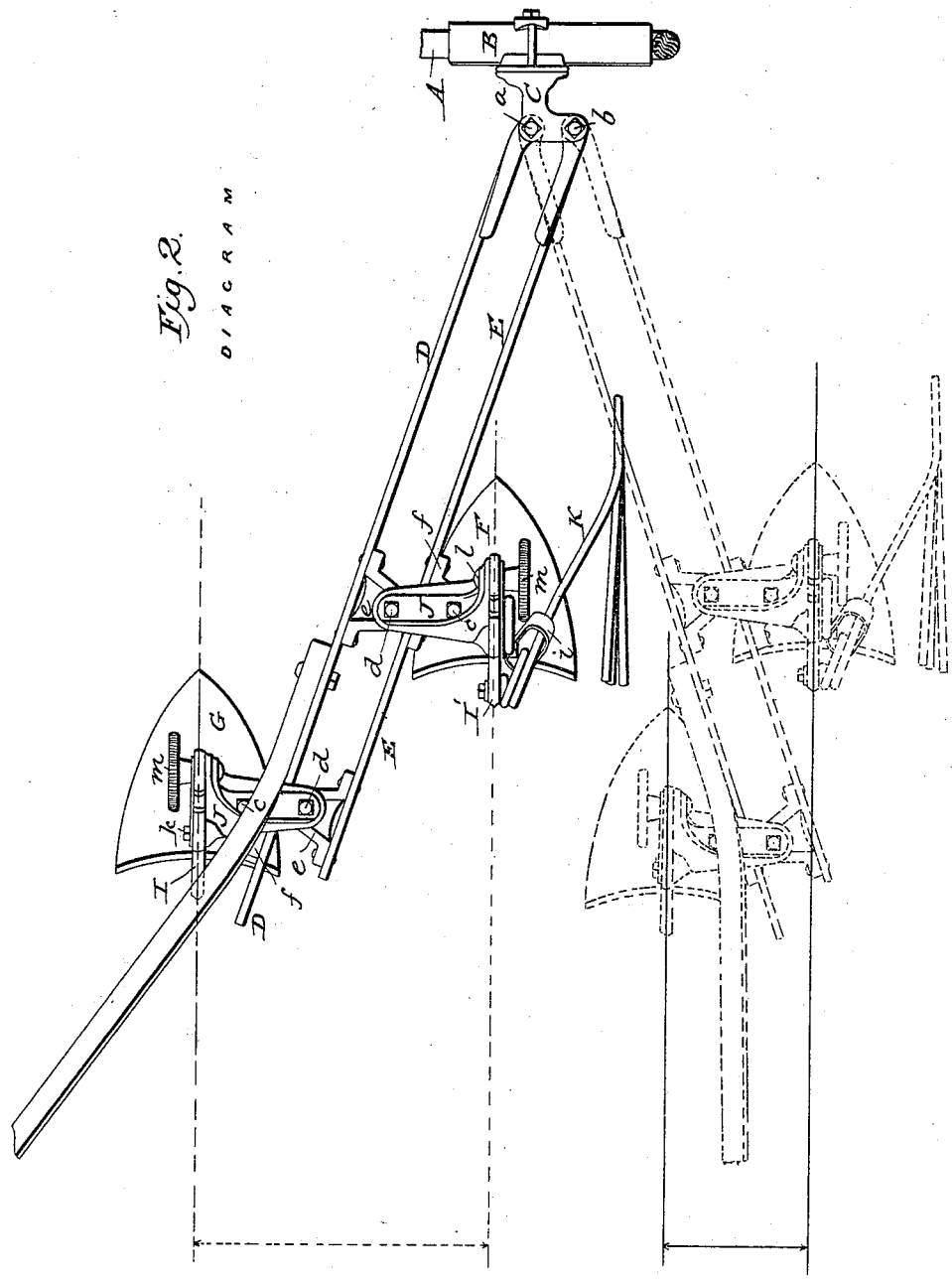

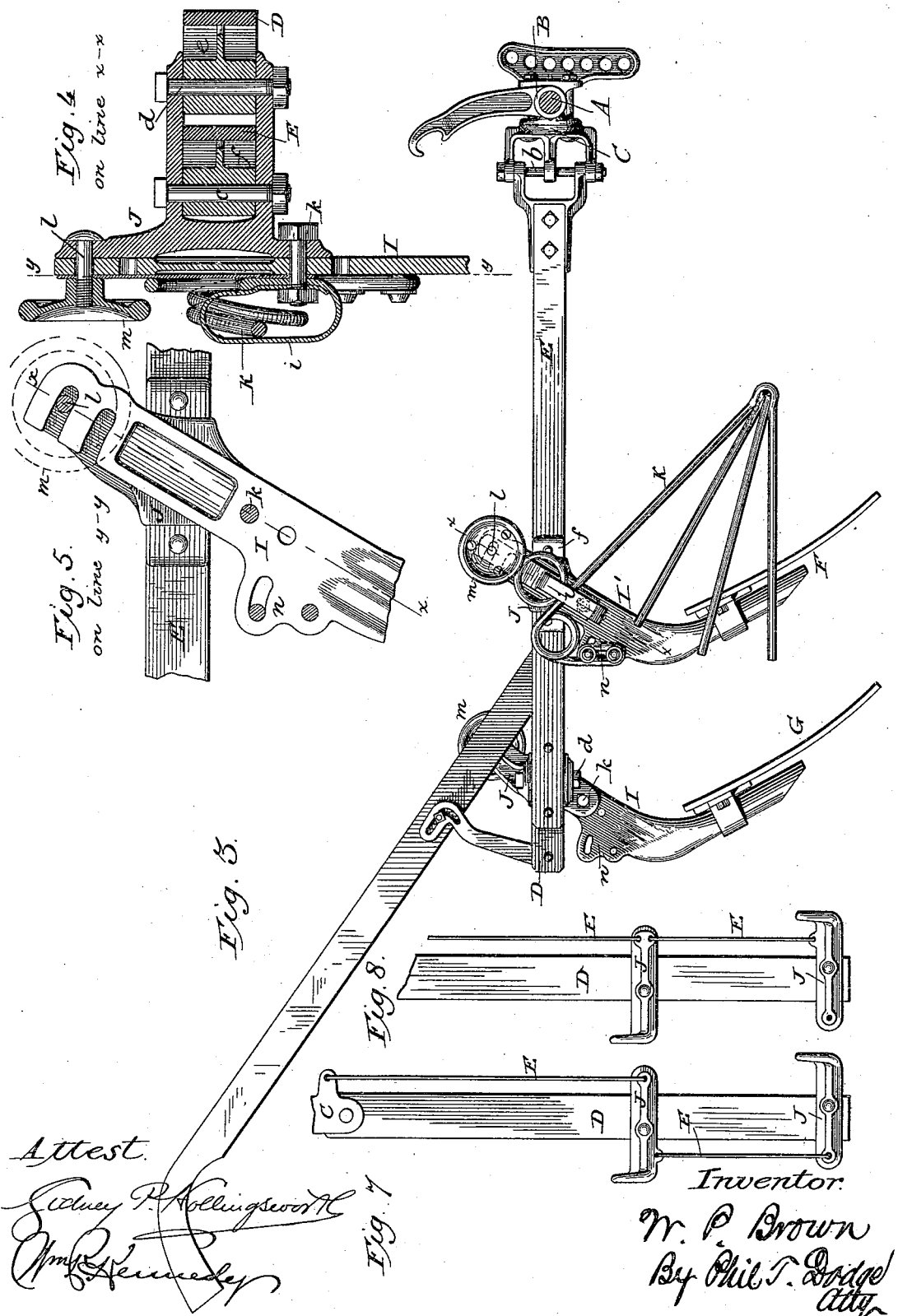

UNITED STATES PATENT OFFICE.

WILLIAM PATTERSON BROWN, OF ZANESVILLE, OHIO.

WHEEL-CULTIVATOR.

SPECIFICATION forming part of Letters Patent No. 345,111, dated July 6, 1886.

Application filed April 5, 1886. Serial No. 197,859. (No model.)

*To all whom it may concern:*

Be it known that I, WILLIAM PATTERSON BROWN, of Zanesville, in the county of Muskingum and State of Ohio, have invented certain Improvements in Wheel-Cultivators, of which the following is a specification.

My invention has reference to that class of wheeled cultivators in which beams or drag-bars are jointed to the frame to swing laterally, and shovels or shovel-standards pivotally connected with the beams in such manner that although the shovels are free to move laterally with the beams their faces are at all times maintained parallel with or at a constant angle to the line of progression—that is to say, with their faces constantly in a plane parallel to the axle or at a constant angle to the axle. In machines of this class, as commonly constructed, the shovels are arranged in pairs, the two shovels of each pair maintaining a constant relation to each other as they are moved laterally.

The principal improvement of my invention is to maintain the faces of the shovels in a constant position with reference to the line of progression, as in the preceding machines, and at the same time to cause a variation in the distance between the two shovels as they are moved laterally, whereby they are the better enabled to discharge or dislodge trash and other obstructing matter which may accumulate upon them.

To this end the invention consists in connecting the two shovels or their standards with the beams by distinct or separate pivots which are not coincident, and various details of construction relating thereto.

The invention further consists in combining with a laterally-swinging beam, either directly or by attachment to the intervening shovel-standard, a fender arranged to maintain a constant position with reference to the line of draft as it is moved laterally with the beam. The object of this construction is to prevent the fender from being swung obliquely out of position as the beam is moved.

The invention also consists in minor details having connection with the fender thus arranged.

My invention is designed more particularly for embodiment in those machines in which an axle arched at the middle and provided with supporting-wheels at its ends is jointed to two backwardly-extending beams or drag-bars, each bar carrying two shovels and provided with a handle by which the shovels are controlled — such, for example, as the machine represented in Letters Patent of the United States granted to me on the 15th day of September, 1885, No. 326,200. As the frame and other parts may be of ordinary construction, and as the two beams and their attachments will be constructed in like manner, I have illustrated in the accompanying drawings only one beam and its attachments.

Figure 6:
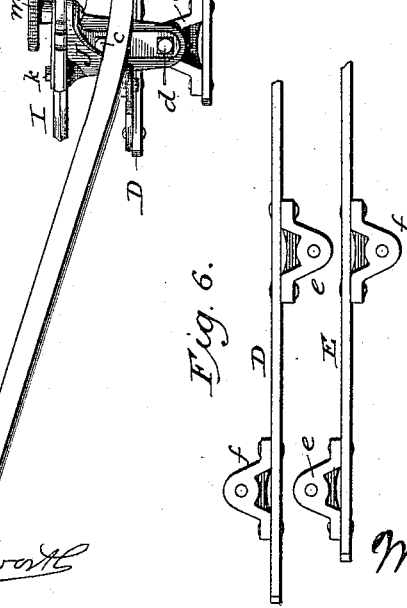

In the accompanying drawings, Figure 1 represents a top plan view of my improved beam connected to an axle. Fig. 2 is a diagram, looking from above, showing the movements of the beam and shovels. Fig. 3 is a side elevation of the parts shown in the preceding figures. Fig. 4 is a cross-section on the line $x$ $x$ of Figs. 1 and 3. Fig. 5 is a vertical section on the line $y$ $y$ of the preceding figure. Fig. 6 is a plan view showing the pivot-bearings on the two bars which constitute the beam. Figs. 7 and 8 are views showing a modified form of the beam.

In the drawings, A represents a horizontal main axle; B, a sleeve or pipe-box revolving loosely thereon, and connected, if desired, with a lifting-spring or with draft devices in the manner commonly practiced in cultivators, to control the vertical action of the beams.

C is a metallic block or plate bolted firmly to the pipe-box to revolve therewith, and forked or divided horizontally at its rear end, to receive two vertical pins or bolts, $a$ and $b$, which serve as pivots for the forward ends of two horizontal bars, D E, which constitute jointly the drag-bar or beam. These bars may be connected directly to the pivots at their forward ends; but they are preferably bolted or riveted, as shown, to separate castings, which receive the pivots. The two bars D and E are free to swing laterally, but remain at all times parallel with each other.

F and G represent the two shovels, pivotally connected to the drag-bar in a manner which will now be explained. Each standard I I' is secured at its upper end to or formed in one piece with a bracket, J, connected by two pivots, c and d, to the respective bars D and E in any appropriate manner, the only requirement being that each shovel-standard shall be connected to the bar D by one pivot, and to the bar E by another pivot.

I prefer to construct the bars D and E of wrought metal, and to bolt blocks e and f thereto to serve as pivot-bearings. When this construction is adopted, each bracket J is forked or divided horizontally, as shown in Fig. 4, that it may embrace or straddle the two beams and the blocks. The pivot-blocks for supporting the standard I of the forward journal, F, are attached to the inner sides of the bars D and E, while the pivot-blocks for the rear standard are applied to the outer sides of said bars. This arrangement places one shovel inside and the other shovel outside of the drag-bar in the usual manner.

Under the above arrangement it will be seen that although the drag-bar D E is free to swing horizontally in order to move the shovels laterally, the faces of the shovels retain their original positions with reference to the line of progression—that is to say, they will not be tipped or turned to either side by the swinging action of the beam.

Owing to the fact that the two shovel-standards turn on separate or independent pivots, and that one is arranged in advance of the other, the distance between the shovels is varied by the lateral motion of the beam, as plainly represented in Fig. 2. The lateral motion effects not only a variation in the distance between the shovels, but also a variation in the distance between the paths in which they are advanced. This action is in practice peculiarly advantageous, in that it enables the operator to more readily dislodge obstructive matters which may accumulate upon the shovel, and also in that it permits the shovels to be carried more conveniently past those plants which grow out of line with the others.

For the purpose of protecting small plants from injury by the clods which may be displaced by the shovels, I propose to provide adjacent to the inner or forward shovel, F, a guard or fender, K. Fenders for this purpose are commonly used in this class of machines; but heretofore they have been attached to the beam or to a shovel-supporting standard fixed to the beam, so that in swinging the beam laterally the shield was turned to an oblique position—that is to say, to a position in which its face was at an angle to the line of progression—whereby its action was impaired and other difficulties produced. My invention consists in so connecting this shield with the beam that it retains its original position in relation to the line of progression, or, in other words, so that it may be carried laterally with the beam and shovels without assuming an oblique position. To this end I prefer to attach the fender at one end to the standard I', jointed to the beam, as above described, and in the drawings I have shown this arrangement. It is to be understood, however, that the fender may be secured to an independent bracket, J, jointed to the two parts of the beam in the same manner as the brackets shown in the drawings, the only essential requirement being that the fender shall at all times stand directly forward in the line of advance.

In the drawings I have represented a fender having a series of diverging arms united at the forward end, the upper arm being extended rearwardly and fashioned into a spring-coil, which is bolted securely to the standard. This construction permits the lower edge of the fender to adapt itself to the surface of the soil. Lateral motion of the fender is prevented by means of a stirrup, i, secured to the standard and embracing its upper end, as shown, the opening being elongated in a vertical direction, to permit a limited play of the fender. While the standards to support the shovel may be of any appropriate form, I find the construction represented in the drawings to be peculiarly advantageous in connection with the other features of my invention.

Referring to the several figures, it will be seen that each standard is united by a horizontal pivot, k, to one end of the bracket, and that its opposite end is notched to receive a bolt, l, which is seated in the bracket, and provided with a hand-nut, m, acting to hold the standard in frictional engagement with the bracket. In the event of the shovel meeting a dangerous resistance the friction will be overcome and the standard permitted to tip forward about the pivot k as a center, thus preventing breakage of the parts. As the shovel faces constantly in a forward direction, it is impossible for the standard to be subjected to side strains, which would interfere with the action of the frictional holding devices, and consequently I am enabled to secure the standard with the necessary firmness under all proper strains, with the assurance that it will yield when required.

In order to permit the attachment of the fender, or of such other devices as may from time to time be required, I provide each standard with a heel projection or ear, n, containing a slot and a pivot-hole, as shown, or two slots, if preferred. A laterally-swinging beam provided with two shovels is commonly known in the art as a "cultivator-gang," and beams having the shovels arranged to face constantly in one direction as they are moved laterally are commonly known as "parallel-motion" beams, and it is with such meanings that said expressions are employed herein.

While it is preferred to construct the bars D and E of rectangular cross-section and of equal size, it is to be understood that either bar may be made of large size to withstand the principal strain, and the other made of relatively small size, for the purpose of controlling the position of the standards as they swing about their horizontal pivots.

In Fig. 7 the main beam D has the standard-carrying brackets J pivoted thereto out of line with each other. The rod E is extended from a pivot on the frame to one end of the forward bracket J, and the latter connected in turn at the opposite end by the rod E with the rear bracket.

In Fig. 8 the two brackets are pivoted to the main beam D, and connected by rods E with each other and with the pivot on the front of the frame.

It will be observed that the above arrangements give the same results—that is to say, the same pivotal action of the brackets and standard—as under the arrangements shown in the preceding figures.

Having thus described my invention, what I claim is—

1. In a cultivator, a laterally-movable beam consisting of two parallel bars, in combination with two shovel-standards, each connected independently of the other to the two bars, whereby the shovels are caused to face in a constant direction with reference to the line of progression, but changed as to the extent of their separation from each other during the lateral motion of the beam.

2. In a cultivator of the parallel type, the combination of a laterally-swinging beam and two shovel-standards connected independently thereto by vertical pivots, one standard in advance of the other, whereby the lateral motion of the beam is caused to vary the distance between the paths of the respective shovels.

3. In a cultivator, the parallel bars D E, connected to vertical pivots at their forward ends, in combination with blocks $e$ and $f$, secured to the respective bars, and a shovel-supporting bracket or plate, J, connected to the respective blocks by vertical pivots.

4. In combination with a drag-bar or beam consisting of two longitudinal bars pivoted to swing horizontally, two shovel-standards pivoted independently to said beam, and arranged, substantially as described, to move to and from each other as the beam is moved horizontally.

5. In combination with the bars D and E, pivoted at their forward ends and provided with pivot-blocks, a forked bracket, J, vertical pivots connecting said bracket with the respective blocks, and a shovel-standard extending rigidly downward from said bracket.

6. In a wheeled cultivator, the combination of a horizontally-swinging beam, a shovel-carrying standard connected thereto by a vertical axis and arranged to face in a constant direction in relation to the line of progression, and a fender, also attached to said standard, whereby the fender is caused to retain its relation to the shovel and also to the line of progression.

7. In combination with a horizontally-swinging beam composed of two parallel bars swinging on separate pivots, a fender and a support for said fender connected to the two bars by vertical pivots, whereby the fender is enabled to move laterally without changing its angle to the line of draft.

8. The combination of the bars D E, pivoted at their forward ends, the plate J, connected to the respective bars by vertical pivots, the shovel-standard attached to the plate J, and the fender K, also attached to said standard.

9. A metallic shovel-standard provided with a heel projection, $n$, substantially as described, whereby it is adapted for the attachment of a fender or equivalent device thereto.

In testimony whereof I hereunto set my hand, this 13th day of March, 1886, in the presence of two attesting witnesses.

WILLIAM PATTERSON BROWN.

Witnesses:
L. E. DODD,
W. A. EATON.